United States Patent
Irvin

[11] Patent Number: 6,138,026
[45] Date of Patent: Oct. 24, 2000

[54] METHOD AND APPARATUS FOR LOCATING A WIRELESS COMMUNICATION DEVICE

[75] Inventor: David Rand Irvin, Raleigh, N.C.

[73] Assignee: Ericsson Inc., Research Triangle Park, N.C.

[21] Appl. No.: 09/097,941

[22] Filed: Jun. 16, 1998

[51] Int. Cl.[7] .............................. H04Q 7/20; H04M 11/00
[52] U.S. Cl. .................... 455/456; 455/404; 342/357.1
[58] Field of Search ............................... 455/456, 404, 455/521, 403, 422, 414; 342/357.09, 357.1, 457; 340/539, 573.1, 572.1, 825.36, 825.49, 311.1, 825.44, 825.45, 989–991, 995

[56] References Cited

U.S. PATENT DOCUMENTS

| | | | |
|---|---|---|---|
| 5,295,180 | 3/1994 | Vendetti et al. | 455/456 |
| 5,365,451 | 11/1994 | Wang et al. | 342/357.1 X |
| 5,388,147 | 2/1995 | Grimes | 379/404 |
| 5,479,482 | 12/1995 | Grimes | 379/556 |
| 5,550,551 | 8/1996 | Alesio | 342/457 |
| 5,568,153 | 10/1996 | Beliveau | 342/357.1 |
| 5,625,668 | 4/1997 | Loomis et al. | 455/456 |
| 5,727,057 | 3/1998 | Emery et al. | 379/211 |
| 5,751,245 | 5/1998 | Janky et al. | 342/357.07 |
| 5,930,699 | 7/1999 | Bhatia | 455/414 |
| 5,999,126 | 12/1999 | Ito | 342/357.1 |

*Primary Examiner*—Nay Maung
*Assistant Examiner*—Tracy M. Legree
*Attorney, Agent, or Firm*—Coats & Bennett, PLLC

[57] ABSTRACT

A method for locating a mobile communication device includes the steps of sensing geocoordinates that represent the telephone's approximate location, comparing the sensed geocoordinates to predefined geocoordinates that represent a home location municipal address, selecting geocoordinates responsive to the comparison, and locating the portable telephone according to the selected geocoordinates. In another embodiment, a cellular telephone includes a positioning receiver for sensing approximate geocoordinates of the cellular telephone, memory for storing home-location geocoordinates, logic for comparing the approximate geocoordinates with the home-location geocoordinates and for selecting a preferred position responsive to the outcome of the comparison; and a radio transmitter for transmitting the preferred position to a public safety answering point.

23 Claims, 8 Drawing Sheets

METHOD AND APPARATUS FOR LOCATING A WIRELESS COMMUNICATION DEVICE

FIELD OF THE INVENTION

The present invention relates generally to mobile communication systems such as cellular telephone systems, and more particularly to an improved method and apparatus for locating a wireless communication device such as a cellular telephone.

BACKGROUND OF THE INVENTION

At present there is great interest in expanding the scope of modern technology into the sphere of personal security. In response to this interest, the capabilities of mobile communication systems such as cellular telephone systems can be enhanced by enabling wireless communication devices such as cellular telephones to place spoken or silent emergency calls to a "911" emergency response center. A person equipped with such a wireless communication device can summon help in case of assault, burglary, or fire, when a conventional wireline telephone is out of reach or out of service.

In this vein, U.S. Pat. No. 5,388,147, "Cellular telecommunication switching system for providing public emergency call location information" and U.S. Pat. No. 5,479,482, "Cellular terminal for providing public emergency call location information" teach combining a cellular telephone and a Global Positioning System (GPS) receiver so that the phone's approximate physical location, i.e., its approximate geocoordinates, can be reported as part of the emergency call. For the convenience of those who respond to the call, the emergency response center—which is called herein a Public Safety Answering Point (PSAP)—converts these approximate geocoordinates into an approximate location municipal street address.

As a cost-saving alternative to the use of GPS technology, the cellular system itself can be equipped with ancillary equipment that enables it to deduce the cellular telephone's position by estimating signal propagation times between the cellular telephone and various terrestrial receivers sometimes located at cellular base stations. This approach to locating the cellular telephone is called here cellular positioning. Adopting cellular positioning rather than GPS eliminates the need to equip each cellular telephone with a GPS receiver, and therefore promises to offer economic advantage. Moreover, radio frequency links provided by cellular systems are more robust than links provided by satellite systems such as GPS, and cellular links may therefore be expected to penetrate deeper into buildings and further behind radio-frequency shadows. Nevertheless, cellular positioning has the disadvantage of being generally less accurate and less capable of fine positioning resolution than GPS positioning.

Various aspects of emergency-response systems based on cellular positioning have been disclosed in U.S. Patent Applications to the present assignee. These applications are: U.S. patent application No. 08/839,859 "Systems and methods for handling emergency calls in hierarchical cell structures;" U.S. patent application No. 08/843,752 "Systems and methods for increasing emergency call access speed in radiocommunication systems;" U.S. patent application 08/839,860 "Systems and methods for identifying emergency calls in radiocommunication systems;" U.S. patent application No. 08/839,864 "Systems and methods for locating remote terminals in radiocommunication systems;" U.S. patent application No. 08/844,883 Systems and methods for providing information to emergency service centers;" U.S. patent application No. 08/838,027 "A cellular positioning systems that compensates for received signal delays in positioning radio receivers;" U.S. patent application No. 08/840,590 "Systems and methods for locating remote units operating in a radiocommunication system using an adjunct system;" and U.S. patent applicaiton No. 08/839,861 "Interaction between an adjunct positioning system and a radiocommunication system."

Regardless of the kind of positioning technology employed, both the determination of the approximate geocoordinates and their conversion to an approximate location municipal street address are subject to process errors, and combining these two process errors may result in an incorrect or incomplete conversion of the geocoordinates. This is especially troublesome in densely populated residential areas such as urban apartment buildings, where, for example, bedrooms of different residences may be nearly contiguous, being separated only by a few inches of wall, or separated mainly in the vertical dimension rather than the horizontal. In such cases it is unclear which apartment the emergency responder should go to.

Thus, the possibility of error and uncertainty limits the extent to which a cellular telephone or other wireless communication device can be used for silent at-home security applications, particularly when cellular positioning is employed. Consequently, there remains a need to improve the positioning accuracy of a wireless communication system to the extent that the at-home location of a wireless communication device can be identified with certainty, so that the wireless communication device can serve better when placing emergency calls such as medical alerts for homebound users unable to reach a wireline terminal, last-resort silent burglar alarms invulnerable to attacks on telephone lines, fire alarms, and the like.

SUMMARY OF THE INVENTION

The present invention improves the positioning accuracy of a mobile communication system, which is particularly important when responding to emergency calls from wireless communication devices such as cellular telephones. According to the present invention, the approximate location of the wireless communication device is first sensed by conventional positioning circuitry. The sensed geocoordinates of the approximate location are then compared with predefined geocoordinates. When the sensed geocoordinates of the approximate location are within a predetermined distance of the predefined geocoordinates, the predefined geocoordinates are selected for use as the location of the wireless communication device.

In one application of the invention, the predefined geocoordinates are the known geocoordinates of the subscriber's home location municipal address. If the approximate-location geocoordinates and the home-location geocoordinates match within predetermined limits, the true location of the wireless communication device is presumed to be the subscriber's home location municipal address, which location is known exactly rather than approximately. Otherwise (i.e., the approximate location and the home-location geocoordinates differ substantially), the device's true location is determined by converting its approximate location geocoordinates to an approximate location municipal street address. Thus, a wireless communication device placing a call from its home location, for example a call for emergency assistance, can be located with precision in a high-density environment such as an urban apartment building. Moreover, with the present invention the device placing a call can be located with precision by a wireless communication system that employs low resolution positioning equipment such as cellular positioning equipment. As a result, the wireless communication device can serve better when placing emergency calls.

These and other aspects of the present invention will become apparent to those skilled in the art after a reading of the following description of the preferred embodiments when considered with the drawings.

DETAILED DESCRIPTION OF THE INVENTION

Figure 1:
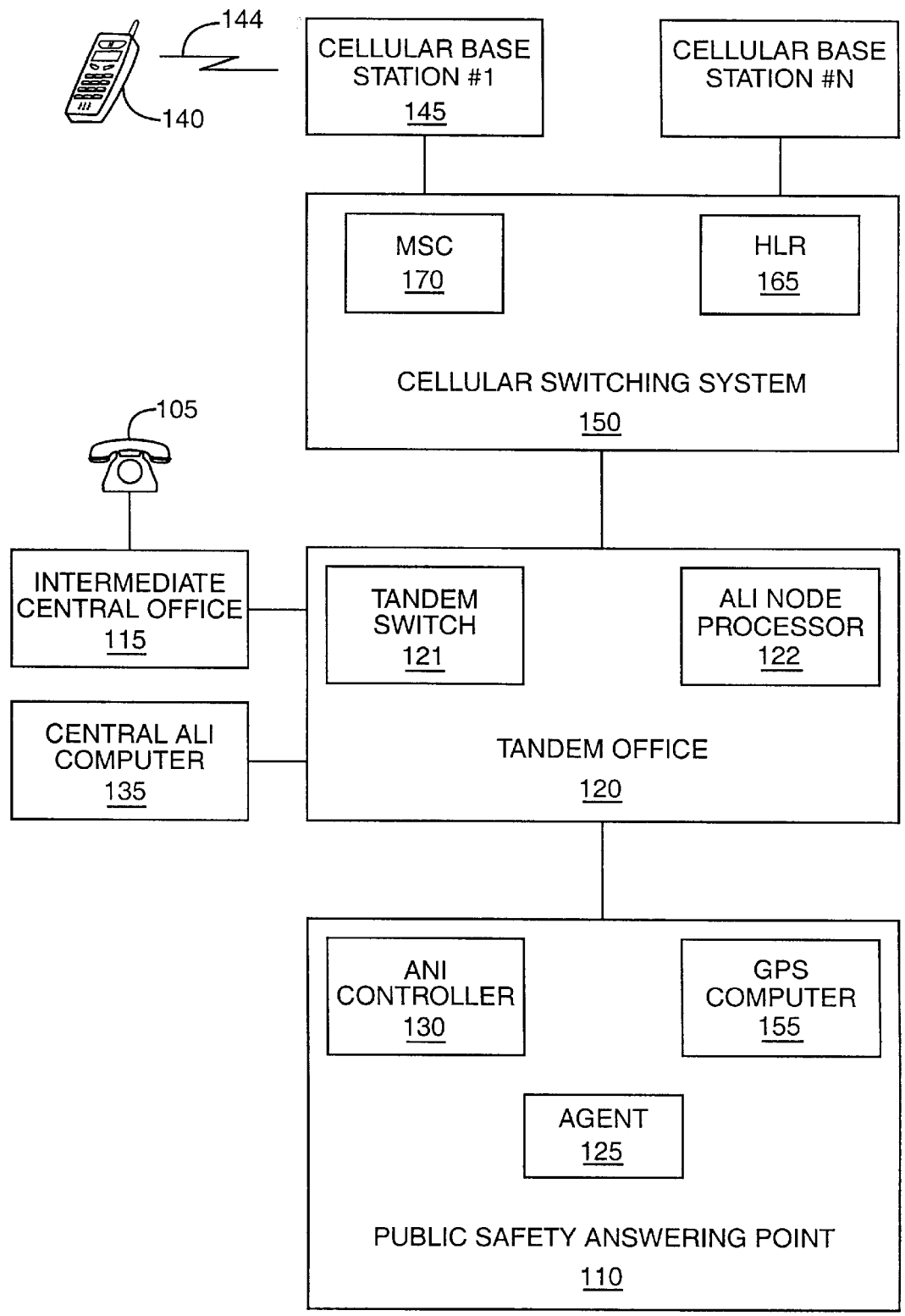
FIG. 1 shows a communication system that is responsive to emergency calls from wireline or wireless telephones.
Figure 2:
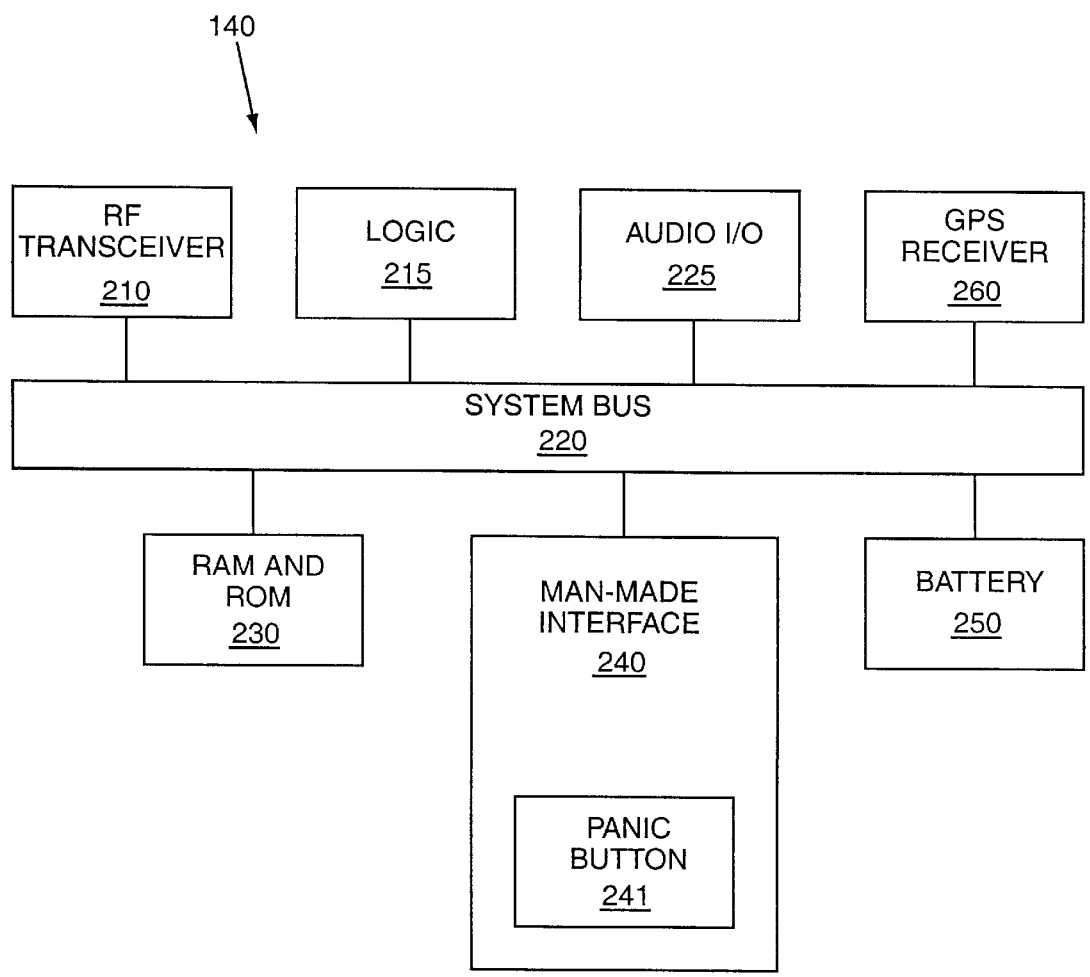
FIG. 2 shows the structure of the cellular telephone shown in FIG. 1 that includes a GPS receiver.

FIGS. 1 and 2 illustrate generally a communication system that supports response to emergency calls from wireline and wireless telephones. An emergency call placed on a wireline telephone 105 is connected to a public safety answering point (PSAP) 110 on a path from an immediate central office 115, through a tandem office 120, to the PSAP 110, and on to an agent 125 who fields the call. An Automatic Number Identification (ANI) controller 130 residing in the PSAP 110 queries a centrally located Automatic Location Identification (ALI) computer 135, by way of a tandem switch 121 and an ALI node processor 122 both associated with the tandem office 120. The purpose of this query is to obtain the home location municipal address of the wireline telephone from a database within the ALI computer 135, which address is returned to the PSAP 110 through the tandem office 120 and forwarded to the agent 125.

An emergency call placed on a cellular telephone 140 is connected to the PSAP 110 over a path that begins with a wireless link 144 from the telephone 140 to a cellular base station 145, and continues by wired or wireless links through a cellular switching system 150 and the tandem office 120, on to the PSAP 110 and its agent 125.

In a conventional manner, the cellular telephone 140 includes a positioning receiver such as a GPS receiver 260 as shown in FIG. 2, along with an RF transceiver 210 for establishing the wireless link 144 with the cellular base station 145, logic 215 for directing the operation of the cellular telephone 140, a system bus 220 that provides electrical and logical connection among the elements of the cellular telephone 140, an audio I/O (input/output) 225 through which the user speaks and listens, RAM and ROM memory 230 for storing data and program-control instructions used in operating cellular telephone 140, a battery 250 that powers the cellular telephone 140, and a man-machine interface 240 through which the user operates the cellular telephone 140. The man-machine interface 240 includes a panic button 241, which the user activates to initiate an emergency call.

With regard to locating the cellular telephone 140, the GPS positioning receiver 260 senses the telephone's approximate location geocoordinates, and reports these geocoordinates to a GPS computer 155 that is located within the PSAP 110 as shown in FIG. 1. The GPS computer 155 converts the approximate location geocoordinates to an approximate location municipal address which is forwarded to the agent 125 fielding the call.

Figure 3:
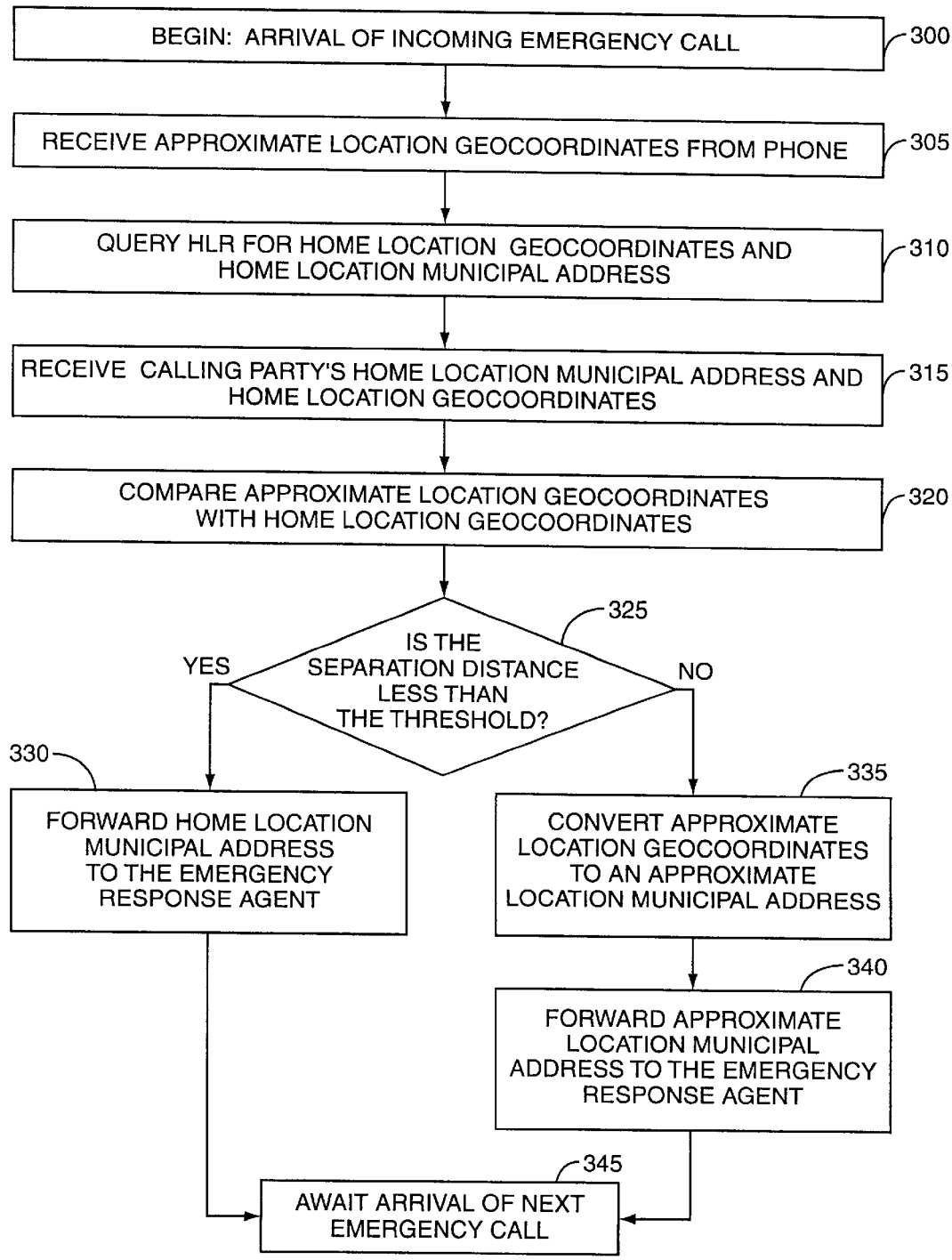
FIG. 3 shows a process for locating the source of an emergency call placed on the cellular telephone shown in FIG. 2.

FIG. 3, with reference to FIGS. 1 and 2, shows a process for locating the source of an emergency call from the cellular phone 140 equipped with the GPS receiver 260. As shown in Block 300 of FIG. 3, the process begins with the arrival at the PSAP 110 of an emergency call placed by a user's activation of the panic button 241, or by the user's other interaction with the cellular phone 140, or automatically in response to some sensed condition. The incoming call carries approximate location geocoordinates, which are the geocoordinates sensed by the GPS receiver 260 in the phone 140.

The GPS computer 155 within the PSAP 110 receives the approximate location geocoordinates (Block 305), and then queries (Block 310) the cellular switching system's home location register (HLR) 165. The purpose of this query is to obtain the service subscriber's home-location municipal address, i.e., the municipal address of the subscriber's principal residence, and its associated home-location geocoordinates, under the supposition that the subscriber and the user are the same person or that they have the same home location. The queried information is prestored in a database in the HLR 165. Next, the GPS computer 155 receives the queried information (Block 315), and compares the approximate location geocoordinates with the home location geocoordinates (Block 320).

Responsive to the outcome of this comparison, the GPS computer 155 selects one of the two sets of geocoordinates, which corresponds to a selected location and municipal address. The selected geocoordinates, location, and municipal address are those believed to best reflect the telephone's true position, based on the outcome of the comparison of the approximate location geocoordinates with the home location geocoordinates. In one embodiment, the two sets of geocoordinates are compared by computing the distance of their separation and comparing this distance to a predetermined distance represented by a predetermined threshold value (Block 325). More specifically, the Euclidean distance can be used for purposes of comparison, as well as other measures indicative of distance.

Whenever the approximate location and home location geocoordinates identify locations in close proximity, i.e., the separation distance is less than the predetermined threshold value, the GPS computer 155 forwards the home location municipal address to the agent 125 fielding the call (Block 330), and the system awaits the next emergency call (Block 345). Whenever the approximate location and home location geocoordinates differ significantly, i.e., the separation distance is not less than the predetermined threshold value, the GPS computer 155 converts the approximate location geocoordinates reported by the cellular phone 140 to an approximate location municipal address (Block 335), and forwards the approximate location municipal address to the agent 125 (Block 340). The system then awaits the next emergency call (Block 345). By using the home location municipal address when advantageous, rather than always locating the cellular telephone 140 by converting its approximate location geocoordinates to an approximate location municipal address, the mobile communication system's positioning accuracy is greatly improved in densely populated environments such as urban apartment buildings. With this improvement, emergency response teams can locate the source of a call for assistance with near certainty.

In the context of the present invention, the agent 125 can be an automated response system or a human, and can be located at the PSAP 110 or located remotely but in communication with the PSAP 110 by means of a wired or wireless link. Together, the PSAP 110 and the agent 125 could constitute a mobile response unit. Moreover, the details of the foregoing embodiment are for purposes of illustration only. Once taught the spirit of the invention, those skilled in the art will realize that the inventive method and apparatus described here could be distributed in other ways within the general structure illustrated by FIGS. 1 and 2.

The multi-record database holding the user's home location geocoordinates or associated home location municipal address could be distributed to other components in the communication system of FIG. 1, as could the point at which the comparison is made between the sets of geocoordinates. The central ALI computer 135, for example, could contain a database or other memory holding the calling party's home location geocoordinates and associated home location municipal address, or could itself query the HLR 165 for the needed information. Optionally, the GPS computer 155 could convert the home-location municipal address to corresponding geocoordinates, which would be compared with the reported approximate-location geocoordinates. Equivalently, the central ALI computer 135 could make the comparison between the sensed approximate location geocoordinates and the predefined home location geocoordinates, and select the better choice. In this case, the processing methods for wireless and wireline calls would be more nearly parallel. Equivalently, a mobile switching center (MSC) 170 and HLR 165 could themselves incorporate a database or other memory and further aspects of the process, and determine whether to forward to the PSAP 110 information on home location municipal address rather than approximate location geocoordinates. Other variants could distribute these functions to the ANI controller 130.

Moreover, it is clear that the home-location municipal address need not be the street address of the subscriber's residence; rather, it could be the street address of the subscriber's or user's business office or other place routinely frequented by the subscriber or user. Also, the subscriber or user could be given the option of loading and changing the home-location municipal address himself, or by automation changing the home-location municipal address to reflect habitual movements. For example, the home location municipal address could be a business address during hours of the workweek, and a residential address outside these hours. In another variant, the approximate location geocoordinates could be compared to members of a predefined list of geocoordinates that represent a plurality of locations the subscriber or user frequents rather than to a single set of home location geocoordinates. Within the dictates of the predetermined threshold value, the best match from this list is selected as the location of the cellular telephone 140. So in general the comparison is between sensed geocoordinates that represent the approximate location of cellular telephone 140 and predefined geocoordinates that represent a location or a plurality of locations frequented by the cellular telephone 140.

Figure 4:
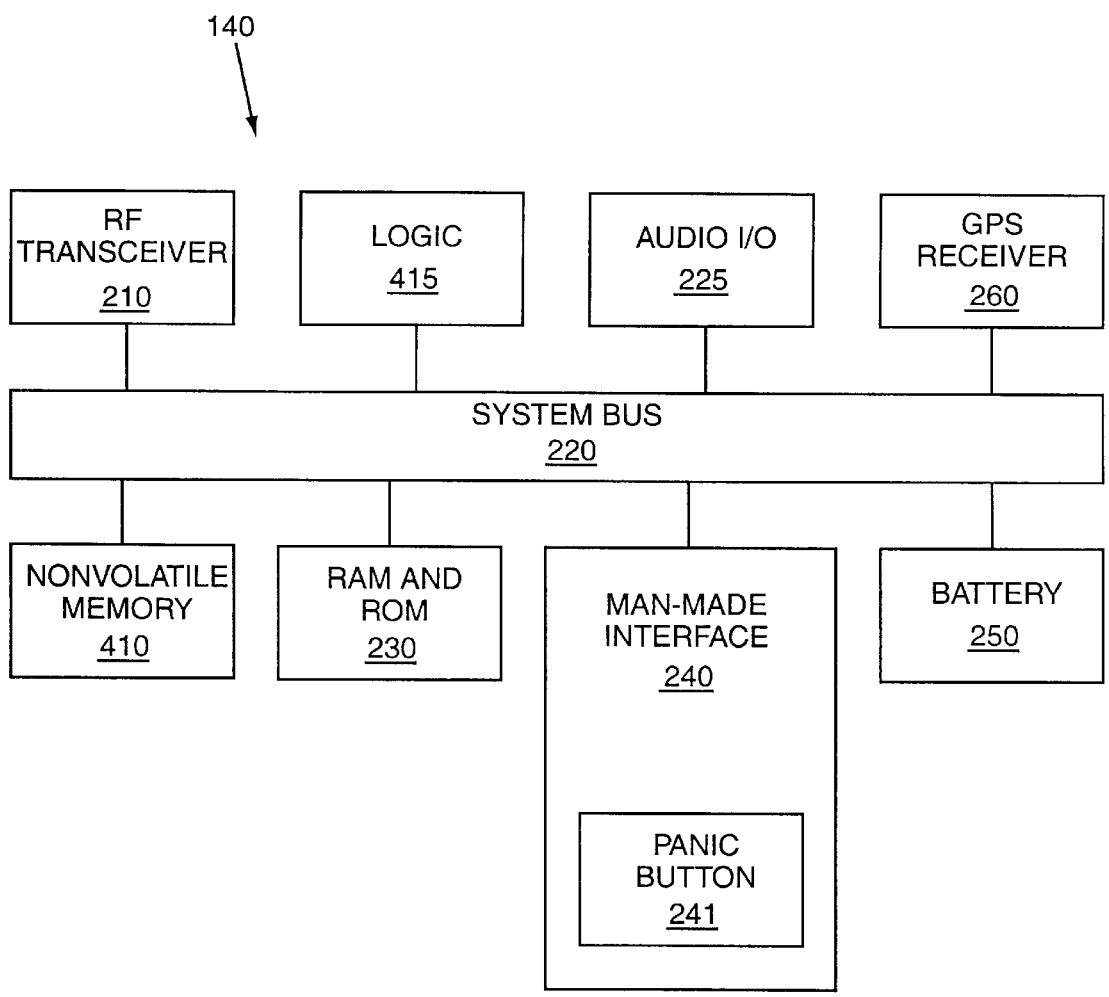
FIG. 4 shows another embodiment of the cellular telephone of FIG. 1 having a positioning receiver and a non-volatile memory that stores the geocoordinates of a home-location municipal address.
Figure 5:
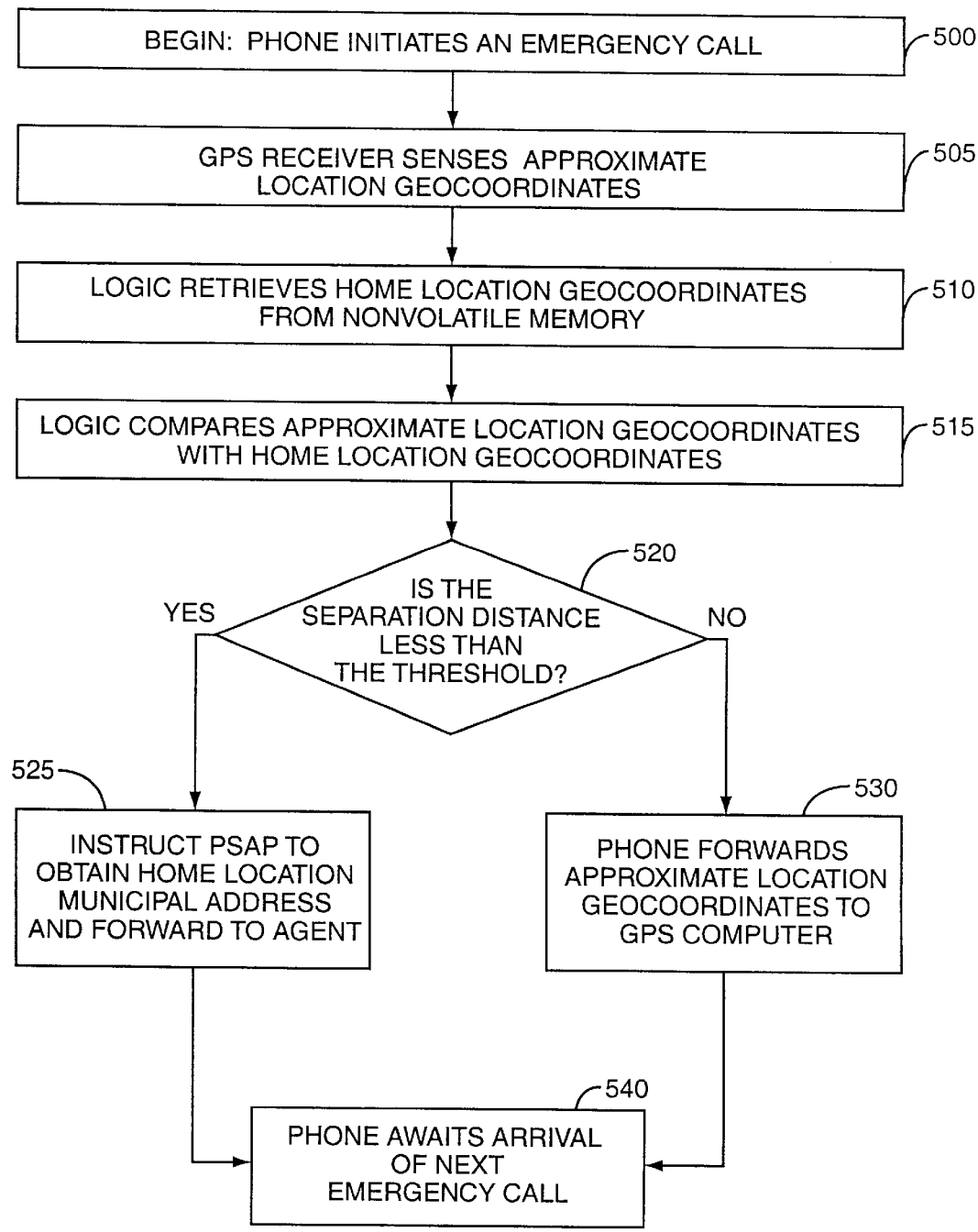
FIG. 5 shows a process for locating the cellular telephone shown in FIG. 4.

FIGS. 4 and 5 show another embodiment of the present invention, wherein a cellular telephone 140 with a GPS positioning receiver 260 also contains a memory such as a nonvolatile memory 410, which stores the home-location geocoordinates, and logic 415, which provides new functions as described below as well as functions provided by the logic 215 of FIG. 2. In the embodiment illustrated by FIGS. 4 and 5, the predefined geocoordinates or corresponding location information is held in the memory 410 within the cellular telephone 140 rather than in a multi-record database outside the cellular telephone 140. The memory 410 may be loaded through the man-machine interface 240, or through attachment of an external device such as a computer or personal digital assistant to the system bus 220, or through the RF transceiver 210. The memory 410 may be loaded at any time, including the time of service initiation or service update, and may be loaded by any person including the subscriber, the user, or a service technician.

As shown in FIG. 5 with reference to FIGS. 1 and 4, the process begins when the cellular telephone 140 initiates an emergency call (Block 500). The GPS receiver 260 senses (Block 505) the approximate-location geocoordinates of the cellular telephone 140. Logic 415 within the cellular telephone 140 retrieves the predefined geocoordinates, which are the home-location geocoordinates (Block 510) previously stored in the non-volatile memory 410, and compares the sensed approximate-location geocoordinates to the home-location geocoordinates by computing the distance of their separation (Block 515). Logic 415 compares the computed separation distance to a predetermined threshold value (Block 520), selects a set of geocoordinates, and in response generates a location message as shown in FIG. 6 and described below.

Whenever the home location geocoordinates and approximate location geocoordinates identify locations in close proximity, i.e., the separation distance is less than the predetermined threshold value, the cellular telephone 140 instructs the PSAP 110 by way of the location message (FIG. 6) to obtain the home-location municipal address and forward it to the agent 125 (Block 525). The cellular telephone 140 then awaits the next emergency call (Block 540). Whenever the two sets of geocoordinates differ significantly, i.e., the separation distance is not less than the threshold, the cellular telephone 140 forwards the approximate location geocoordinates by way of the location message (Block 530), which the PSAP 110 receives and converts to an approximate location municipal address. The cellular telephone 140 then awaits the next emergency call (Block 540).

Figure 6:
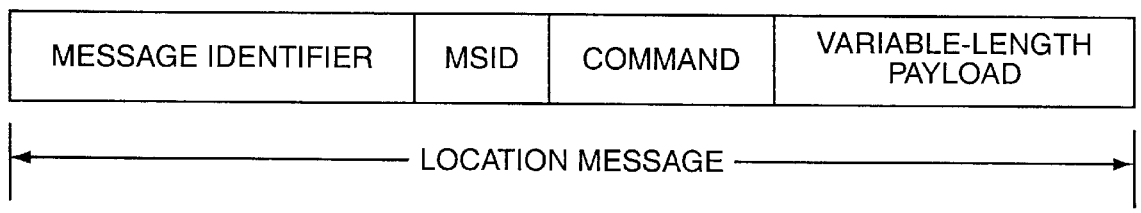
FIG. 6 shows a location message generated by the cellular telephone shown in FIG. 4.

FIG. 6 shows the basic structure of the location message. Those skilled in the art will recognize that the purpose of this message could be well served by subsets or supersets of the basic structure shown, or by many equivalent structures. The location message, which is sent to the PSAP 110 by way of a cellular system's random access control channel (RACCH), imbedded control channels, secondary data channels provided by digital cellular equipment, or other equivalent means, comprises a message identifier to distinguish it from other types of messages, an MSID field identifying the originating cellular telephone, a two-bit command field identifying the nature of the message's payload, and the payload itself, which has variable length and which carries location information. In FIG. 6, the command field provides the following information:

XX=00 means that the location information comprises approximate location geocoordinates;

XX=01 means that the location information comprises home location geocoordinates;

XX=10 means that the location information comprises an instruction to the PSAP 110 to query the HLR 165 to obtain the home-location municipal address; and XX=11 means that the location information comprises the home-location municipal address.

Again, functions within this embodiment of the present invention can be distributed in a number of alternative ways. In one alternative embodiment, the GPS computer 155 within PSAP 110 receives the incoming location message sent by the cellular telephone 140. If the location message contains approximate-location geocoordinates, the GPS computer 155 computes an approximate location municipal address. In contrast, if the location message received from phone 140 contains an instruction to use the home-location municipal address rather than approximate location geocoordinates, the GPS computer 155 queries the HLR 165 to get the home-location municipal address. Alternatively, the nonvolatile memory 410 in cellular telephone 140 could contain both the home-location municipal address and the home-location geocoordinates, and the cellular telephone 140 could then send the home-location municipal address in the location message rather than instructions to obtain and use the home-location municipal address, thereby eliminating the need to query the HLR 165. In another variation, the GPS computer 155 may contain its own database of home-location municipal addresses.

The foregoing embodiments all presuppose that the cellular telephone incorporates a GPS receiver or other positioning receiver to sense the approximate location geocoordinates. However, the cellular telephone's incorporation of a positioning receiver is not necessary to the present invention. As previously mentioned, a cellular telephone's location can be deduced by a plurality of cellular base stations that collaborate to measure and compare time-of-arrival or time-difference-of-arrival measurements. Such systems are called herein "cellular positioning systems" to distinguish them from positioning systems based on GPS or other technology.

Figure 7:
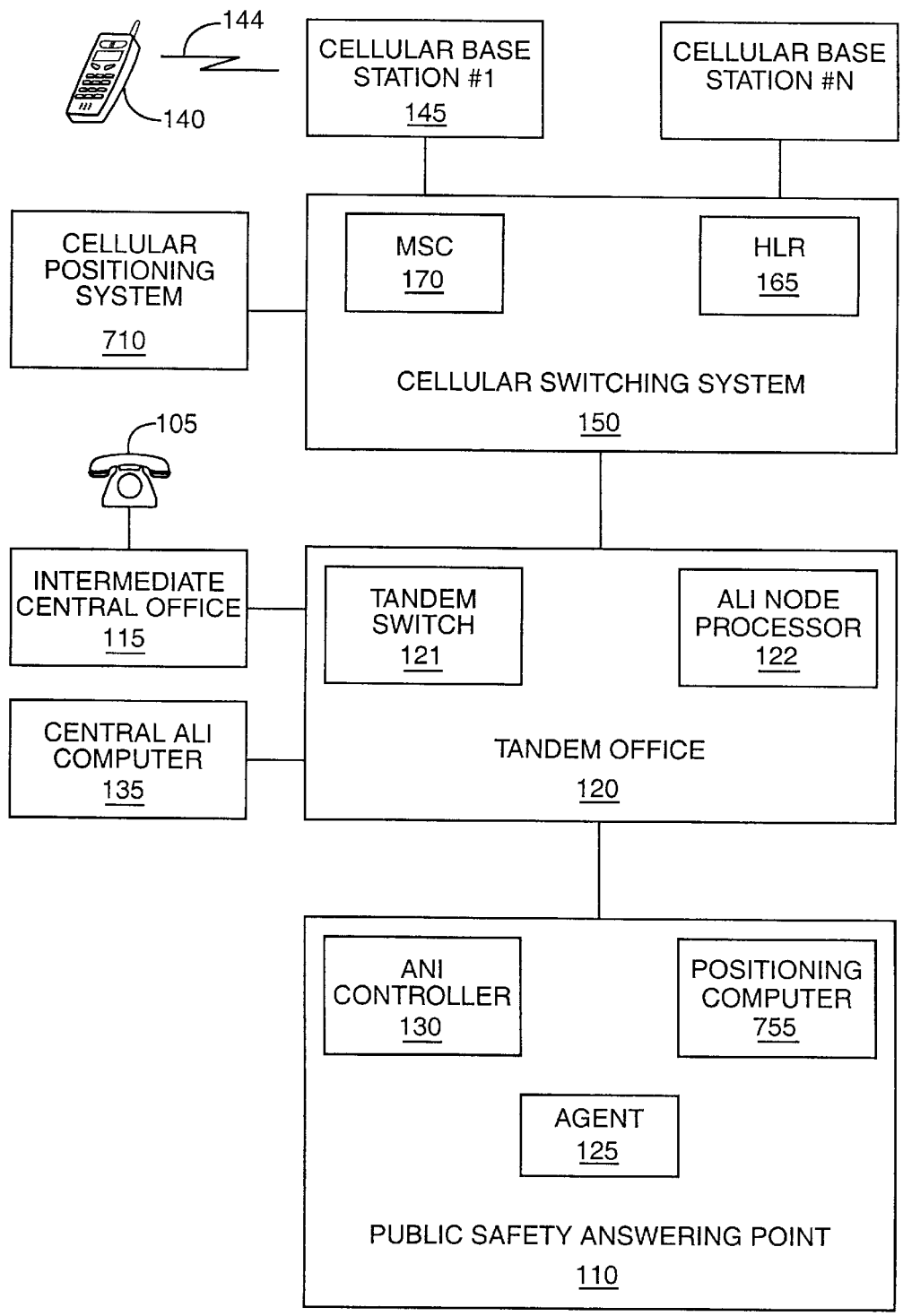
FIG. 7 shows communication equipment including cellular positioning apparatus according to another embodiment of the present invention.

The present invention applies as well to the location of wireless communication devices and the processing of emergency calls placed on cellular systems equipped with cellular positioning systems. FIG. 7 shows such a system, which differs from the system shown in FIG. 1 by the addition of a cellular positioning system 710 to the cellular switching system 150. Further, the GPS computer 155 of the PSAP 110 shown in FIG. 1 is replaced by a positioning computer 755 in FIG. 7, which also resides preferably in the PSAP 110. The positioning computer 755 compares approximate location geocoordinates of the cellular telephone 140, which in this embodiment are the geocoordinates sensed by the cellular positioning system 710, with predefined geocoordinates, which are the home location geocoordinates from HLR 165, and converts the approximate location geocoordinates from the cellular positioning system 710 to an approximate-location municipal addresses.

Figure 8:
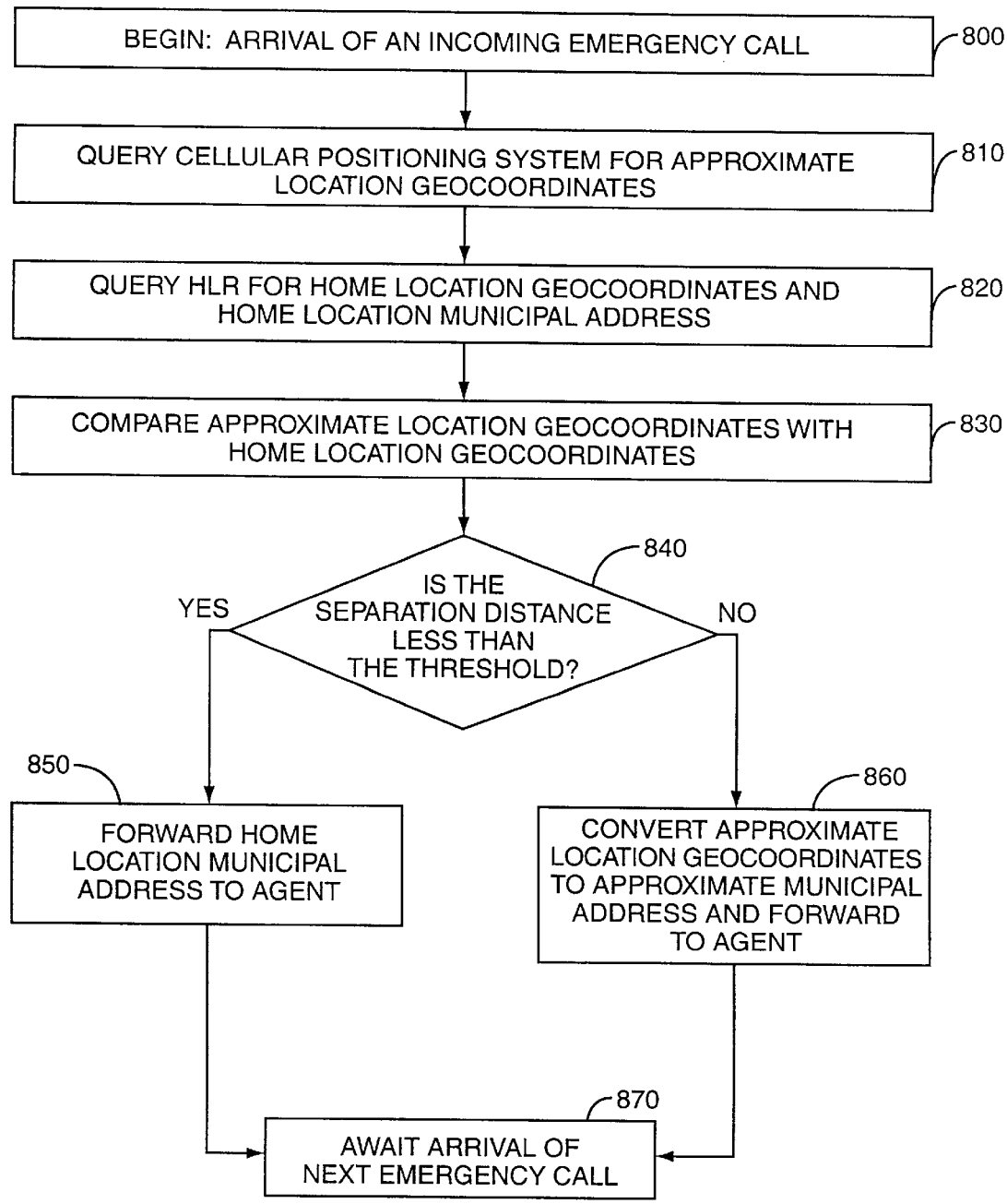
FIG. 8 shows a process for locating the source of an emergency call placed on the cellular telephone of FIG. 7.

FIG. 8, with reference to FIG. 7, shows an embodiment of the present invention that provides an improved way of processing an emergency call placed on a cellular telephone 140 that operates in a cellular telephone system equipped with a cellular positioning system 710. As shown in Block 800 of FIG. 8, the process begins with the arrival at the PSAP 110 of an emergency call. The positioning computer 755 within the PSAP 110 queries the cellular positioning system 710 to obtain approximate location geocoordinates (Block 810), and queries the HLR 165 to obtain the home-location geocoordinates and corresponding home-location municipal address stored therein (Block 820). The positioning computer 755 then compares the approximate-location geocoordinates with the home-location geocoordinates (Block 830) by computing the distance of their separation, and compares this computed separation distance to a predetermined threshold value (Block 840).

Whenever the two sets of geocoordinates identify locations in close proximity, i.e., the separation distance is less than the predetermined threshold value, the positioning computer 755 forwards the home-location municipal address to the agent 125 fielding the call (Block 850), and the system awaits the next emergency call (Block 870). Whenever the two sets of coordinates differ significantly, i.e., the separation distance is not less than the predetermined threshold value, the positioning computer 755 converts the approximate-location geocoordinates provided by the cellular positioning system 710 to an approximate municipal address, and forwards this approximate municipal address to the agent 125 (Block 860). The system then awaits the next emergency call (Block 870). By using the home location municipal address when advantageous, rather than always locating the cellular telephone 140 by converting its approximate location geocoordinates to an approximate location municipal address, the mobile communication system's positioning accuracy is greatly improved in densely populated environments. This improvement is especially beneficial when cellular positioning is used rather than GPS, as cellular positioning systems lack the accuracy and resolution of GPS positioning systems.

As can be appreciated, the functionality of FIGS. 7 and 8 can be redistributed or combined without deviating from the scope of the present invention. The comparison of approximate-location and home-location geocoordinates could be made by the cellular switching system 150 with the selected geocoordinates forwarded to the PSAP 110. Further, the approximate location appended automatically to the data flow from the cellular switching system 150 to the agent 125, rather than queried explicitly.

The present invention has been described in connection with the processing of emergency calls that occur on cellular telephone systems, but is not limited to such use, and applies to all kinds of calls that occur on wireless communication devices in general and to devices that incorporate the functions of wireless communication devices. Once taught the spirit of the present invention, one who is skilled in the art will understand that the present invention applies as well to one-way wireless communication devices including beacons and cellemetry equipment as well as to two-way devices such as telephones and satellite-cellular communication systems. Furthermore, the invention may, of course, be carried out in specific ways other than those set forth herein without departing from the spirit and the essential characteristics of the present invention. Consequently, the present embodiments are to be construed in all aspects as illustrative and not restrictive. All changes coming within the meaning and equivalence range of the appended claims are intended to be embraced by these claims.

I claim:

1. A method for locating a mobile communication device, comprising the steps of:

storing one or more subscriber defined locations in a user location database, each subscriber defined location being associated with at least one subscriber and having predefined geocoordinates;

receiving sensed geocoordinates, which define the approximate location of the mobile communication device;

comparing the sensed geocoordinates with the predefined geocoordinates which define a plurality of locations at which the mobile communication device can reside; and selecting the a subscriber defined location for use as the location of the mobile communication device when the sensed geocoordinates are within a predetermined distance of the predefined geocoordinates.

2. The method of claim 1, wherein the predefined geocoordinates represent a service subscriber's home location municipal address.

3. The method of claim 1, wherein said step of comparing further comprises the step of computing a Euclidean distance between locations defined by the sensed geocoordinates and the predefined geocoordinates.

4. The method of claim 3, further comprising the steps of:

comparing the Euclidean distance to a predetermined threshold value; and selecting the predefined geocoordinates when the Euclidean distance is no greater than the predetermined threshold value.

5. The method of claim 1, further comprising the step of acquiring the sensed geocoordinates from information provided by Global Positioning System satellites.

6. The method of claim 1, further comprising the step of acquiring the sensed geocoordinates from information provided by a cellular positioning system.

7. The method of claim 1, further comprising the step of sending the sensed geocoordinates to a cellular base station over a wireless link.

8. The method of claim 1, further comprising the step of storing the predefined geocoordinates in a memory disposed in the mobile communication device.

9. The method of claim 1, which further comprises the step of retrieving the predefined geocoordinates from a memory disposed in the mobile communication device.

10. A method for locating a mobile communication device, comprising the steps of:

storing one or more subscriber defined locations in a user location database, each subscriber defined location being associated with at least one subscriber and having predefined geocoordinates;

sensing, in the mobile communication device, geocoordinates that represent the approximate location of the mobile communication device;

transmitting the sensed geocoordinates to a wireless base station over an RF communication path;

retrieving from a memory the predefined geocoordinates;

computing a distance between the sensed geocoordinates and the predefined geocoordinates;

comparing the distance to a predetermined threshold value; and determining a municipal street address from the subscriber defined location when the distance is no greater than the predetermined threshold value.

11. The method of claim 10, further comprising determining the municipal street address from the sensed geocoordinates when the distance is greater than the predetermined threshold value.

12. A method for locating a mobile communication device, comprising the steps of:

storing one or more subscriber defined locations in a user location database, each subscriber defined location being associated with at least one subscriber and having predefined geocoordinates, at least one of said subscriber defined locations being representative of the subscriber's home location municipal address;

acquiring sensed geocoordinates based on global positioning system information that represent the mobile communication device's approximate location;

retrieving the predefined geocoordinates that represent a location at which the mobile communication device can reside from a memory disposed in the mobile communication device;

computing a distance between the sensed geocoordinates and the predefined geocoordinates;

comparing the distance to a predetermined threshold value;

selecting the subscriber defined location to define the location of the mobile communication device when the distance is no greater than the predetermined threshold value; and transmitting location information representing the predefined geocoordinates to a wireless base station over an RF communication path.

13. A method for locating a mobile communication device, comprising the steps of:

storing one or more subscriber defined locations in a user location database, each subscriber defined location being associated with at least one subscriber and having predefined geocoordinates;

retrieving predefined geocoordinates from user location database;

computing a distance between the sensed geocoordinates and the predefined geocoordinates;

comparing the distance to a predetermined threshold value;

selecting the subscriber defined location to represent the location of the mobile communication device when the distance is no greater than the predetermined threshold value; and determining a municipal street address representing the subscriber defined location from the subscriber defined location when the distance is no greater than the predetermined threshold value.

14. A communications device, comprising:

an input circuit that receives sensed geocoordinates which represent the approximate location of a mobile terminal and predefined geocoordinates that represent one or more subscriber defined locations, each subscriber defined location being associated with at least one subscriber; and a positioning circuit that compares the sensed geocoordinates and the predefined geocoordinates and generates a location message, which is indicative of the location of the mobile terminal, in response to the comparison, said positioning circuit comprising:

comparison circuitry that generates a distance signal which is indicative of the distance between the sensed geocoordinates and the predefined geocoordinates; and location generation circuitry that outputs the sensed geocoordinates as the location message when the distance, represented by the distance signal, is within a predetermined threshold value.

15. The communications device according to claim 14, wherein:

the input circuit and positioning circuit are disposed within the mobile terminal.

16. The communications device according to claim 15, wherein:

the mobile terminal comprises a cellular phone.

17. The communications device according to claim 15, further comprising:

a positioning receiver that senses the geocoordinates which represent the approximate location of the mobile terminal and outputs the sensed geocoordinates to the input circuit.

18. The communications device according to claim 15, further comprising:

an RF receiver that receives the sensed geocoordinates over an RF communications channel and provides the received geocoordinates to the input circuit.

19. The communications device according to claim 15, further comprising:

an RF transmitter that transmits the location message over an RF communications channel.

20. The communications device according to claim 14, wherein:

the input circuit and positioning circuit are disposed within a base station.

21. The communications device according to claim 20, further comprising:

a positioning receiver that senses the geocoordinates which represent the approximate location of the mobile terminal and outputs the sensed geocoordinates to the input circuit.

22. The communications device according to claim 20, further comprising:

an RF receiver that receives the sensed geocoordinates over an RF communications channel and provides the sensed geocoordinates to the input circuit.

23. The communications device according to claim 20, further comprising:

a circuit that generates a municipal street address from the location message.

\* \* \* \* \*